United States Patent Office 3,448,020
Patented June 3, 1969

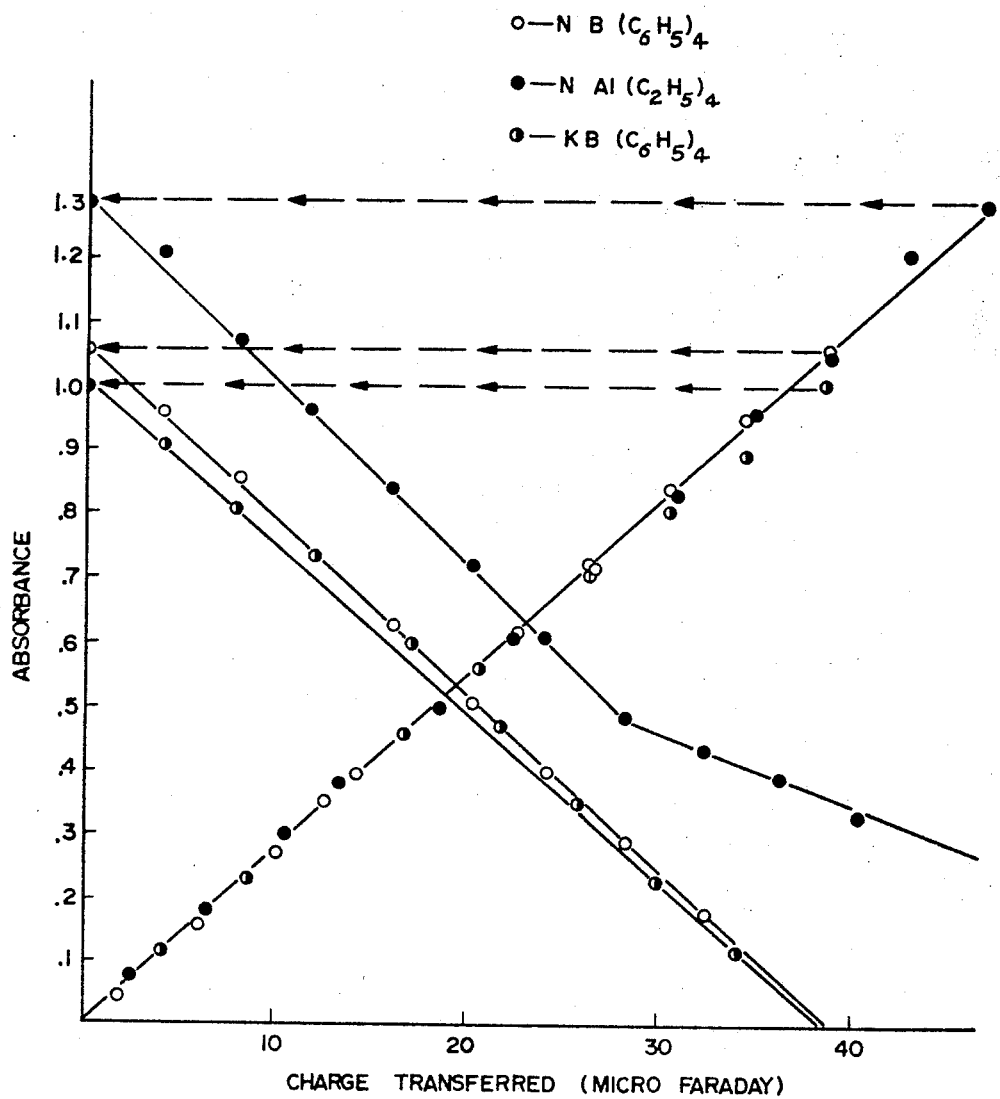

3,448,020
PROCESS FOR THE CONTROL OF ANIONIC POLYMERIZATION BY REGULATION OF THE CHARGE TRANSFERRED DURING ELECTROLYSIS OF SOLUTIONS
Boris Lionel Funt, Winnipeg, Manitoba, Canada (1153 Eyremount Drive, West Vancouver, British Columbia, Canada)
Filed Feb. 25, 1966, Ser. No. 530,090
Int. Cl. B01k 1/00
U.S. Cl. 204—72                                    20 Claims

ABSTRACT OF THE DISCLOSURE

A method of controlling the progress of anionic polymerization by passing an electrolytic current through the solution thereby controlling the population of Living Ends.

---

This invention relates to improvements in the control of anionic polymerization by regulation of the charge transferred during electrolysis of solutions.

The process of anionic polymerization is now well established as a major synthetic method in the field of polymer chemistry. It is recognized that polymers formed under carefully controlled conditions will have very narrow molecular weight distributions. In this and in other respects, such polymers are superior to those formed by free radical methods. Furthermore, classes of substances exist which can only be polymerized readily by anionic mechanisms.

The kinetics of Living anionic polymerizations have been investigated by many workers, and it is generally accepted that the rate of reaction is given simply by:

Rate=$k_p$ (Living Ends)(M)    Equation 1 where the Living End concentration refers to the anions and dianions present in the reaction mixture which can undergo further chain growth, M is the monomer concentration and $k_p$ is the rate constant for the propagation reaction.

In a typical case, dianions may be formed by the addition of sodium naphthalene to a solution of terahydrofuran containing the monomer. Any proton donating impurities will destroy the Living Ends. It is, therefore, essential that stringent care be taken to maintain the impurity level below $10^{-4}$ molar for kinetic work or for synthetic purposes. Otherwise, a rapid destruction of the Living Ends and a cessation of the reaction will result.

If, however, the Living End concentration is not reduced by inadvertent interaction with impurities or other reactive groups, it is possible to maintain the concentration of active species at a high level until the monomer is exhausted.

In conventional anionic syntheses as described above, the maintenance of an adequate concentration of living species can only be achieved under the most stringent laboratory conditions. Even in such circumstances, the Living End concentration cannot be predicted accurately as it is inevitably affected by residual levels of impurities. This implies that the course of the reaction cannot be controlled beyond the feasible limits imposed by the stringent requirements for purity. In a similar fashion, the molecular weight control is affected by these same considerations. In all instances, the course of the reaction is determined in advance by the concentration of initiating sodium naphthalene and the fraction of the substance which is inadvertently destroyed.

With certain monomers containing carbonyl groups or other labile groups subject to attack by the Living Ends, the concentration of Living Ends is rapidly reduced by interaction at these sites in competition with attack on the double bond of the monomer. Thus, with allylic compounds and with members of the methacrylate family of monomers, a conventional anionic polymerization rapidly ceases as the Living End concentration is reduced to a negligible level.

Similar considerations apply in the methods employed for the production of block copolymers. In these methods a solution of living polymer is mixed with another monomer and propagation to the second species takes place. The comments on impurity levels and on the importance of a control of the Living End concentration also apply in these instances.

This invention describes a means of overcoming the deficiencies heretofore noted. The passage of an electrolytic current provides a method of generating an accurately known concentration of Living Ends. Manipulation of the current and its polarity can be used to increase or decrease the concentration of Living Ends to any desired level at any time during the polymerization.

It is therefore an object of this invention to provide a means of generating any desired concentration of Living Ends.

A further object is to provide a method of estimating the concentration of Living Ends by a direct measurement of the charge transferred to the solution.

Another object is to provide a means of forming a polymer of any desired molecular weight distribution.

A still further object of the invention is to provide a means of producing a polymer which is essentially monodisperse.

Still another object of the invention is to provide a means of producing block copolymers of predetermined structure.

A further object of the invention is to provide a means of controlling the rate of reaction at a constant value despite changes in the monomer concentration.

Yet another object of the invention is to provide a means for compensating for the destruction of Living Ends by interaction with labile groups in the monomer and thus, permit the polymerization of monomers which cannot normally be polymerized by the living anionic mechanism.

All of the above objects can be achieved by controlling the population of Living Ends by suitable adjustment of the electrolytic current passing through the solution.

The embodiment of these various objectives into practice can be illustrated by results obtained with electrolysis of solutions of alphamethylstyrene, styrene and isoprene. The vinyl group of monomers of general formula of $CH_2=C(R_1)(R_2)$ where $R_1$ and $R_2$ are electron withdrawing groups or electrophilic groups, is amongst the most common and most important. In the instance where $R_1$ is hydrogen and $R_2$ is phenyl, we have styrene. In all cases, $R_1$ and $R_2$ are electron withdrawing groups or electrophilic groups.

With the foregoing in view, and all those objects, purposes or advantages which may become apparent from consideration of this disclosure and specification, the present invention consists of the inventive concept embodied in the method, process, construction, arrangement of parts, or new use of the same, as herein particularly exemplified in one or more specific embodiments of such concept, reference being had to the accompanying figures in which:

FIGURE 3 is a schematic diagram showing a method of feed-back control for the reaction.

In the drawings like characters of reference indicate corresponding parts in the different figures.

Figure 1:
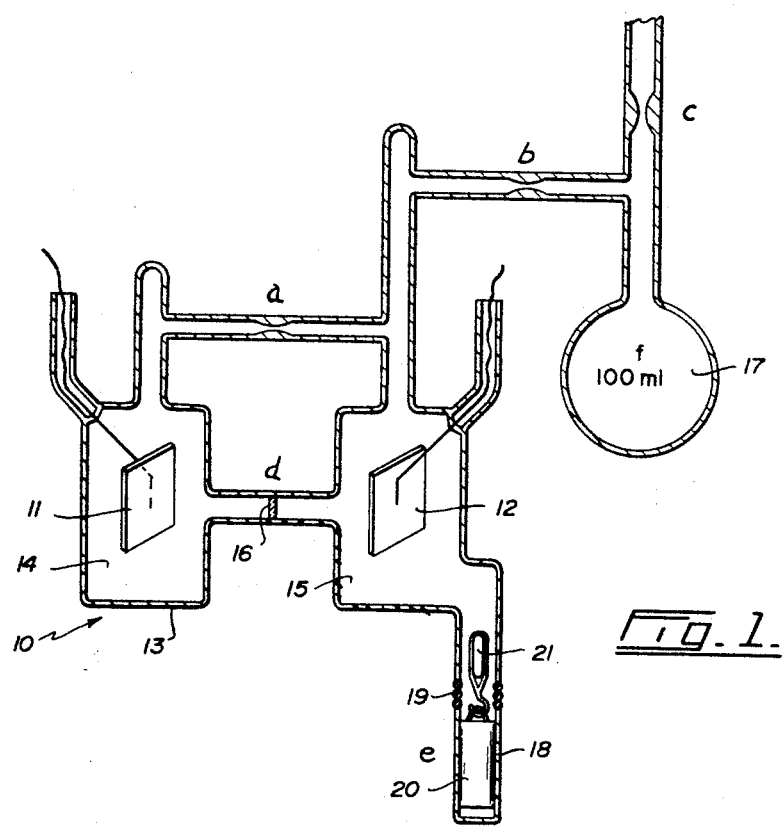
FIGURE 1 is a schematic view of an electrolysis cell utilized in the present instance.

The laboratory experiments were performed in the apparatus generally designated 10 as shown schematically in FIGURE 1.

An anode electrode 11 and a cathode electrode 12 were housed in the divided cell 13 and these anodes are preferably of platinum with dimensions approximately 1″ x 1″.

The divided cell is formed into two compartments 14 and 15 separated by a fine fritted glass disc 16, 1 cm. in diameter.

All transfers were made under vacuum line techniques and the apparatus could be sealed and isolated after charging with reactants. The solvent must be a basic solvent, i.e. one which will not donate protons to the Living Ends resulting in their destruction. Tetrahydrofuran (T.H.F.) a solvent commonly employed in anionic polymerization, was found suitable for this work. The salts employed were of the general formula $MB(C_6H_5)_4$ where M is an alkali metal.

Tetraphenylboron salts are not sensitive to atmospheric moisture and are not pyrophoric, and therefore provide additional advantages in ease of handling. Although the final reaction system must be dried scrupulously, the preliminary preparation of the tetraphenylboron salts was facilitated by their relative inertness.

A known amount of salt (Ca. .5 g.) was dissolved in 10 ml. pure THF and introduced in the filling bulb 17. The bulb was attached to the vacuum line, the contents frozen in liquid $N_2$ and evacuated. The THF was distilled off and the salt dried in vacuo at 50° C. for 24 hours. The basic procedure was modified slightly to handle the pyrophoric $NaAl(C_2H_5)_4$ and the sparingly soluble $KB(C_6H_5)_4$. For the former sealed ampoules of the salt were prepared in a dry box and the ampoule was crushed and its contents mixed with the solution after the latter had been under high vacuum for 24 hours.

The monomer and THF were purified rigorously by established methods and were degassed by four to five freeze-thaw cycles. A known amount of freshly distilled monomer was transferred into the filling bulb 17 under vacuum. THF was distilled from a Na film into a measuring tube and then into the apparatus. The apparatus was flame-sealed at C at $10^{-6}$ mm. Hg pressure. The contents brought to room temperature and transferred to the electrolysis cell 13. The total volume of solution was 84.8 ml. at 25° C. The cathode compartment 15 volume was 55.2+0.5 ml. and the monomer concentration in THF was 0.43 M.

The appendage 18 to the cathode compartment 15 of the cell was a 1 x 1 cm. quartz optical absorption cell coupled to the apparatus by a graded seal 19. A 9 mm. spacer 20 is inserted into the cell and is moved by a magnet 21 to provide a mixing of the contents.

If additional polymerization was desired the constriction a was sealed, the contents were transferred to the bulb 17 by tilting the apparatus, the constriction b was flame-sealed and the detached bulb immersed in a cold bath at −78° C. The living polymer was killed with a few drops of methanol.

Various modifications of the basic apparatus were employed in different types of experiments. Thus, solutions of the second monomer could be placed into the appropriate appendages of the basic apparatus and additional bulbs attached for other purposes if necessary.

In this work currents between .1 and 10 ma. were employed but the selection of these values was based upon a desired rate of production of colour in the cell compartment. Other work has shown that with the same area electrode currents of over 100 ma. could be employed without diffusion entering as a limiting factor. Furthermore, by increase of the area of the electrodes, the current density can be maintained at a low value if the current is increased further.

With salt concentrations employed as described here, the applied voltage on the cell was low and the total voltage was generally under 10 volts.

The embodiment of the various objectives of this invention into practice were illustrated by results obtained with electrolysis of solution of alphamethylstyrene and of styrene. Although alphamethylstyrene is a colourless monomer, the Living anions produce a deep red colour. The concentration of Living Ends can be measured directly by spectrophotometric methods, and the concentration can be compared with the number of electrons transferred by the passage of current. The results are assembled in Table I and show that for three salts, namely, sodium aluminium tetraethyl, sodium tetraphenyl boron and potassium tetraphenyl boron the absorbence of the solution increased in a manner which was strictly proportional to the current passed through the solution.

TABLE I

[Proportional relationship between optical absorbence at 340 millimicrons and charge transferred. Date refer to three salts in tetrahydrofuran solution of 0.43 molar alphamethyl styrene]

| Salt | | | | | |
|---|---|---|---|---|---|
| $KB(C_6H_5)_4$ | | $NaAl(C_2H_5)_4$ | | $NaB(C_6H_5)_4$ | |
| Charge Transferred ($F \times 10^6$) | Absorbence | Charge Transferred ($F \times 10^6$) | Absorbence | Charge Transferred ($F \times 10^6$) | Absorbence |
| 4.04 | 0 | 4.04 | .078 | 4.04 | .009 |
| 12.12 | .116 | 8.08 | .177 | 8.08 | .015 |
| 16.17 | .233 | 12.12 | .280 | 12.12 | .046 |
| 20.20 | .352 | 16.17 | .379 | 16.17 | .161 |
| 24.25 | .456 | 20.21 | .498 | 20.21 | .276 |
| 28.29 | .556 | 24.25 | .605 | 24.25 | .396 |
| 33.94 | .699 | 28.29 | .715 | 28.29 | .505 |
| 37.99 | .796 | 32.33 | .830 | 32.33 | .611 |
| 42.03 | .886 | 36.37 | .959 | 36.37 | .720 |
| 46.07 | .997 | 40.41 | 1.047 | 40.41 | .837 |
| | | 44.45 | 1.209 | 44.45 | .951 |
| | | 48.50 | 1.284 | 48.50 | 1.055 |

Other salts can be used of the same structure designated $MAlX_4$ where M is an alkali metal, X is an alkyl group of the formula $C_nH_{2n+1}$ where $n$ is between 1 and 5 and $MBY_4$ where M is an alkali metal, B is boron and Y is an operative phenyl derivative such as phenyl, tolyl and similar aromatics.

Figure 2:
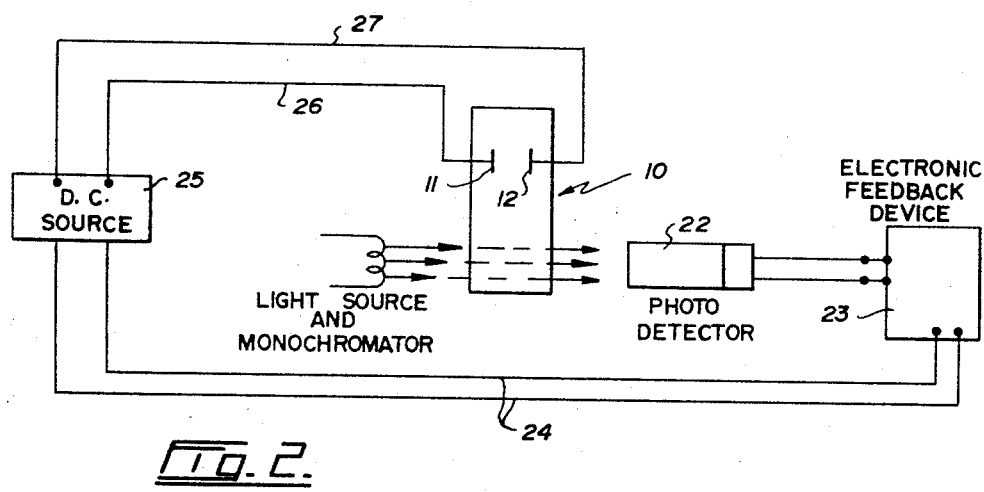
FIGURE 2 is a graph showing the results of experiments and illustrating the formation of Living Ends by electrolysis followed by their destruction on reversal of polarity.

The data are shown in FIGURE 2 where the amount of charge transferred after the end of the induction period is plotted. The relative induction periods for the three salts correspond to the passage between 2 and 10 microfaradays. This represented the removal of 2 to 10 micromoles of impurity in the reaction volume. This impurity level is approximately $4 \times 10^{-5}$ molar. It should be noted, however, that larger impurity levels can be tolerated in this invention in contrast to the conventional methods. Such larger levels would involve the passage of a correspondingly increased charge prior to the development of the colour denoting the permanent formation of Living Ends. After the first appearance of colour, the increase of absorbence is strictly proportional to the charge transferred at the electrode. Experimentally, this is equivalent to the time of electrolysis at constant current.

Thus the population or concentration of Living Ends can be brought to any desired value by the passage of a predetermined charge. The course of the reaction is then completely predictable on the basis of Equation 1 heretofore described.

I have found that the Living End concentration can be reduced electrolytically by reversal of the current. In the experimental arrangement employed, if the polarity at a given electrode is reversed, the colour will diminish in direct proportion to the number of electrons transferred at the electrode. This is again shown in FIGURE 2 for data with alphamethylstyrene. Similar data have been obtained for styrene and isoprene. Thus, it is possible to form a given concentration of Living Ends and allow these to polymerize to form polyanions of a desired length. If these are now killed quickly, by reversal of current, or by addition of methanol, or other proton donating substances, a monodisperse distribution of molecular weight will be obtained.

Alternatively, the potentialities of molecular weight control inherent in the present methods can be illustrated by the following example:

If a given concentration of Living Ends is formed electrolytically, and polymerization allowed to proceed until one-half the monomer is consumed, it is possible by reversal of the current to kill precisely 90% of the Living Ends and to permit the remaining 10% of the Living Ends to polymerize with the remaining monomer until the latter is exhausted. Thus, a molecular weight distribution of 50% polymer of molecular weight 10,000 and 50% of polymer of molecular weight 90,000 could be obtained. Any other combination of molecular weights can be predetermined and controlled in a likewise manner. The extension of such methods to a controlled molecular weight distribution is obvious. Such methods will yield polymers with useful and predictable physical properties.

In a similar manner, tailored mixtures of homo-polymers and copolymers can be produced. Thus, if in the previous example, the remaining 10% of the Living Ends were allowed to impinge on a second monomer, a block copolymer could be produced with this latter species.

In all the examples thus far specified, it would be possible to destroy the Living Ends by capping the Living anions with desired end groups. Such end groups could later be reacted to couple chains into new additional block structures.

Other variations employed in the invention are exemplary of the scope thereof. In one series of experiments, alphamethylstyrene was generated electrolytically and a portion of the solution of Living anions was dropped into styrene monomer where it initiated a rapid polymerization. The solution was then transferred back from the appendage into the cathode compartment of the electrolytic cell, the current reversed and the Living End concentration reduced to a predetermined value. Further styrene monomer was then introduced into the reaction cell and the remaining low concentration of Living Ends polymerized to a much higher molecular weight material. The reaction mixture was killed with methanol, the contents precipitated, and the molecular weight distribution determined.

An important application of this invention is its use in the polymerization of a monomer with labile or reactive substituents. For example, the carbonyl groups in methylmethacrylate represent a point of attack for the living ions in competition with the vinyl double bond. This results in an attrition of the Living End population and produces a premature termination of the reaction. The variation of the Living End concentration also produces a distribution of molecular weights which is generally undesirable.

For the polymerization of such monomers, the reaction can be controlled at a fixed concentration of Living Ends by passage of current through the solution. A suitable feed-back mechanism is diagramed in FIGURE 3. The colorimeter or spectrophotometer 22 is adjusted to select light of a wave length corresponding to the maximum absorption by the Living anions. Once this value is determined, the spectrophotometer 22 is locked at this wave length. The relationship between Living End concentration and optical absorbence is known from the extinction coefficient for most monomers. It can be determined experimentally in a series of prior experiments if necessary. A desired concentration of Living Ends is predetermined and the charge transferred through the solution adjusted so that this Living End concentration is produced. Any attrition in the Living End concentration will result in a decrease in the absorbence of the solution. Such a decrease generates a feed-back signal by a conventional feed-back device 23 which is connected electrically by conduits 24 to the D.C. source of current 25 which in turn is connected electrically by conduits 26 and 27 to the anode 11 and cathode 12 respectively.

This controls the passage of electrolytic current through the solution so that the color intensity and the Living End concentration remain constant in the reaction mixture. Under these conditions, a relatively uniform molecular weight product will be attained and the reaction can be conducted at desired rate.

Another application of this invention is a programming of a reaction to proceed at a constant rate. If instead of programming the current to maintain a constant concentration of Living Ends, the current passed through the solution is maintained at a value such that the product of the Living End concentration and the monomer concentration is maintained constant, then the rate of reaction will remain constant as is evidence from Equation 1. It is thus possible to compensate for the reduction in the monomer concentration during the progress of the reaction, by an increase in the Living End concentration generated electrolytically. It is therefore, possible to perform a reaction at a fixed rate until almost complete exhaustion of the monomer is encountered.

Since various modifications can be made to the invention herein described within the scope of the inventive concept disclosed, it is not intended that protection of the said invention should be interpreted as restricted to the modification or modifications or known parts of such concept as have been particularly described, defined, or exemplified, since this disclosure is intended to explain the construction and operation of such concept, and not for the purpose of limiting protection to any specific embodiment or details thereof.

What I claim as my invention is:

1. A method of controlling the progress of anionic polymerization comprising the passing of electrolytic current through a cathode in contact with a conducting solution, said solution being separated from an anode by a diaphragm, said solution containing a monomer with electrophilic substituents in a basic solvent suitable for anionic polymerization, and a salt selected from the group consisting of:

MAlX$_4$ where M is an alkali metal, X is an alkyl group of the formula C$_n$H$_{2n+1}$ where $n$ is between 1 and 5, and MBY$_4$ where M is an alkali metal, B is boron and Y is an operative phenyl derivative.

2. The method according to claim 1 which includes a step of producing any predetermined concentration of Living anions by the passage of the equivalent charge through said solution.

3. The method according to claim 1 which includes the step of reducing the concentration of Living anions by a predetermined amount, by the reversal of the polarity of the said current.

4. The method according to claim 1 which includes the step of producing a polymer which is mono-disperse in molecular weight distribution by maintaining a Living anion concentration at a constant value by passing a trickle of current through said solution sufficient to compensate for any inadvertent interaction in the said solution with active Living anions.

5. The method according to claim 1 which includes the step of controlling the Living anion population at a pre-determined value by the provision of feed-back current control.

6. The method according to claim 1 which includes the step of conducting said anionic polymerization at a constant rate which compensates for the change in monomer concentration during the course of the reaction.

7. A method according to claim 1 in which the decrease in Living anion concentration which would result from the interaction of these substituents with the living anions is compensated by the flow of electrolytic current.

8. The method according to claim 7 in which the monomer is a very monomer of the formula $CH_2=C(R_1)(R_2)$ where $R_1$ and $R_2$ are electrophilic groups.

9. The method according to claim 7 in which the monomer with reactive side groups is an allyl monomer with electrophilic substituents each capable of being polymerised by an anionic mechanism but with substituents which interact slowly with the Living anions.

10. The method according to claim 1 in which the monomer is a vinyl monomer of the formula $CH_2=C(R_1)(R_2)$ where $R_1$ and $R_2$ are electron withdrawing groups or electrophilic groups.

11. The method according to claim 1 in which the monomer is selected from the group consisting of styrene, methylmethacrylate isoprene and alphamethyl styrene.

12. A method according to claim 2 with the subsequent addition of a second monomer with which the Living polyanions will react.

13. The method according to claim 12 in which the monomer is a vinyl monomer of the formula $CH_2=C(R_1)(R_2)$ where $R_1$ and $R_2$ are electrophilic groups.

14. The method according to claim 2 in which the monomer is a vinyl monomer of the formula $CH_2=C(R_1)(R_2)$ where $R_1$ and $R_2$ are electron withdrawing groups or electrophilic groups.

15. The method according to claim 3 in which the monomer is a vinyl monomer of the formula $CH_2=C(R_1)(R_2)$ where $R_1$ and $R_2$ are electron withdrawing groups or electrophilic groups.

16. The method according to claim 4 in which the monomer is a vinyl monomer of the formula $CH_2=C(R_1)(R_2)$ where $R_1$ and $R_2$ are electron withdrawing groups or electrophilic groups.

17. The method according to claim 5 in which the monomer is a vinyl monomer of the formula $CH_2=C(R_1)(R_2)$ where $R_1$ and $R_2$ are electron withdrawing groups or electrophilic groups.

18. The method according to claim 6 in which the monomer is a vinyl monomer of the formula $CH_2=C(R_1)(R_2)$ where $R_1$ and $R_2$ are electrophilic groups.

19. A method of producing polymers of various predetermined molecular weight distributions consisting of generating Living anions by the passage of electrolytic current, permitting said anions to add a monomer thus forming Living polyanions, then terminating a fraction of said Living polyanions by the process of reversing the polarity and passing a quantity of electrical charge stoichiometrically determined on the basis of one electron transferred for one Living End terminated, and then conducting the polymerization so that the reduced concentration of living polyanions reacts with the available monomer.

20. The method according to claim 19 in which the monomer is a vinyl monomer of the formula $CH_2=(R_1)(R_2)$ where $R_1$ and $R_2$ are electrophilic groups.

References Cited

UNITED STATES PATENTS

| | | | |
|---|---|---|---|
| 2,822,357 | 2/1958 | Brebner et al. | 260—94.9 |
| 3,140,276 | 7/1964 | Forster | 260—88.7 |
| 3,335,075 | 8/1967 | Borman | 204—59 |

FOREIGN PATENTS 566,274   11/1958   Canada.

JOHN H. MACK, *Primary Examiner.*

H. M. FLOURNOY, *Assistant Examiner.*

U.S. Cl. X.R.

204—59

UNITED STATES PATENT OFFICE
CERTIFICATE OF CORRECTION

Patent No. 3,448,020     Dated June 3rd, 1969.

Inventor(s)     B. L. Funt

It is certified that error appears in the above-identified patent and that said Letters Patent are hereby corrected as shown below:

Column 7, line 3.  Change "very" to --vinyl--.

SIGNED AND
SEALED
MAY 12 1970

(SEAL)
Attest:

Edward M. Fletcher, Jr.
Attesting Officer

WILLIAM E. SCHUYLER, JR.
Commissioner of Patents